United States Patent
Xia et al.

(10) Patent No.: US 8,565,618 B2
(45) Date of Patent: Oct. 22, 2013

(54) AUTOMATIC WAVELENGTH CONFIGURATION

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 401 days.

(21) Appl. No.: 12/897,998

(22) Filed: Oct. 5, 2010

(65) Prior Publication Data

US 2012/0082469 A1    Apr. 5, 2012

(51) Int. Cl.
*H04B 10/04*    (2011.01)

(52) U.S. Cl.
USPC ........... 398/196; 398/195; 398/200; 398/182; 398/95; 356/73.1; 356/450

(58) Field of Classification Search
USPC ............. 398/196, 195, 192, 182, 180, 83, 79, 398/200, 95; 356/73.1, 450
See application file for complete search history.

(56) References Cited

U.S. PATENT DOCUMENTS

| | | | | |
|---|---|---|---|---|
| 5,907,417 A | * | 5/1999 | Darcie et al. | 398/20 |
| 6,067,150 A | * | 5/2000 | Beller et al. | 356/73.1 |
| 7,126,680 B2 | * | 10/2006 | Yamate et al. | 356/73.1 |
| 7,146,085 B2 | * | 12/2006 | Tadakuma et al. | 385/122 |
| 7,215,416 B2 | * | 5/2007 | Yamate et al. | 356/73.1 |
| 8,213,002 B2 | * | 7/2012 | Kassler et al. | 356/73.1 |
| 2002/0176134 A1 | * | 11/2002 | Vohra | 359/127 |
| 2006/0210269 A1 | * | 9/2006 | Farhadiroushan et al. | 398/48 |
| 2007/0165978 A1 | * | 7/2007 | Chen et al. | 385/12 |
| 2007/0252998 A1 | * | 11/2007 | Berthold et al. | 356/450 |
| 2009/0074019 A1 | * | 3/2009 | Wong et al. | 372/26 |
| 2009/0080880 A1 | * | 3/2009 | Lee et al. | 398/14 |
| 2010/0014071 A1 | * | 1/2010 | Hartog | 356/73.1 |

FOREIGN PATENT DOCUMENTS

WO    WO2009040144    *    4/2009

* cited by examiner

*Primary Examiner* — Daniel Washburn
*Assistant Examiner* — Hibret Woldekidan

(57) ABSTRACT

An optical transmitter may include a tunable signal source configured to emit a signal to an optical fiber system; a back scatter detector for measuring an amount of back scatter observed following injection of the signal to the optical fiber system; and control logic. The control logic may be configured to cause the tunable signal source to scan through a range of wavelengths. Measured amounts of back scatter are received for each of the wavelengths. A wavelength corresponding to a peak back scatter amount may be identified and the tunable signal source may be set based on the identified wavelength.

20 Claims, 10 Drawing Sheets

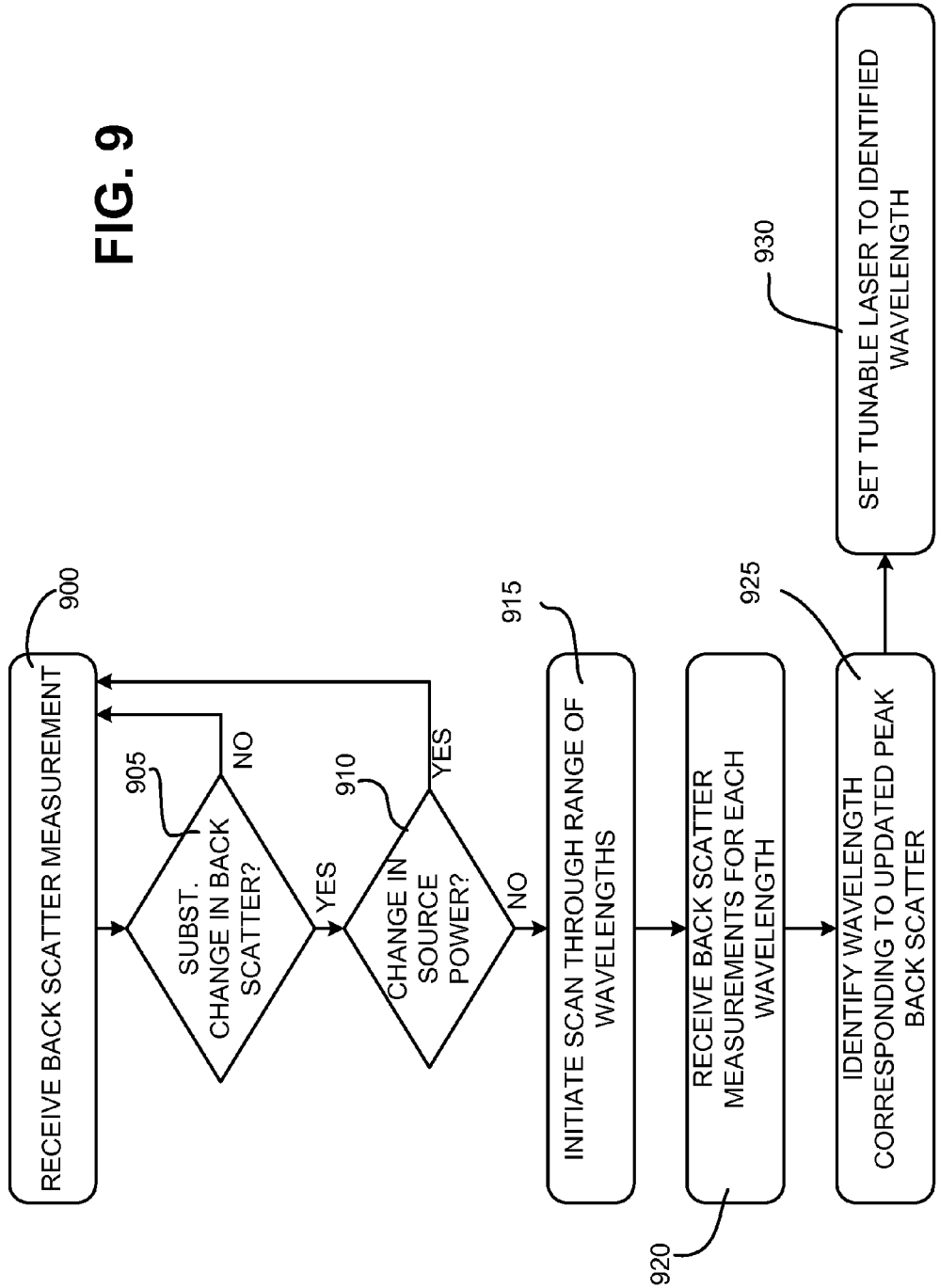

US 8,565,618 B2

AUTOMATIC WAVELENGTH CONFIGURATION

BACKGROUND INFORMATION

With the proliferation of fiber optic networks, the use of devices that include tunable lasers is substantially increasing. For example, wave division multiplexing (WDM) and dense WDM (DWDM) systems may include multiplexer devices having a number of discrete channels, each having an associated wavelength. Transponder cards used with such systems may include tunable lasers that are set based on the wavelength of the channel to which they are connected. In typical systems, setting or tuning of the laser is inefficient and expensive, requiring complex interactions between different devices in the system, such as between the transponder cards and the multiplexer. In some implementations, external management and control systems are required to communicate with the various network devices, to allow the devices to exchange configuration and capabilities information.

BRIEF DESCRIPTION OF THE DRAWINGS

FIG. 9 is a flow diagram illustrating exemplary processing associated with configuring a wavelength of the transmitter of FIG. 8.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to configuring a tunable laser or other optical source for use in a wavelength division multiplexing (WDM) or dense WDM (DWDM) environment. As described generally above, DWDM enables transmission of data signals having a number of different wavelengths into a single optical fiber.

In one implementation, an optical transmitter may be configured to include a tunable optical source (e.g., a tunable laser), a controller, and an optical reflection monitor. An optical signal from the optical source may be transmitted to a port on a multiplexer device associated with a particular wavelength (this is also referred to as a "channel"). The multiplexer is coupled to a downstream optical fiber plant, such as a long-haul optical fiber.

The controller is configured to scan the wavelength of the optical source through a range of wavelengths. Simultaneously with the wavelength scanning, the optical reflection monitor may monitor back reflection from the optical fiber plant. In one embodiment, a back reflection peak may be identified, and the optical source wavelength corresponding to the peak back reflection may be identified as the wavelength associated with the port or transponder in the multiplexer. The controller may be configured to set the wavelength of the optical source based on the identified wavelength for subsequent use.

Figure 1:
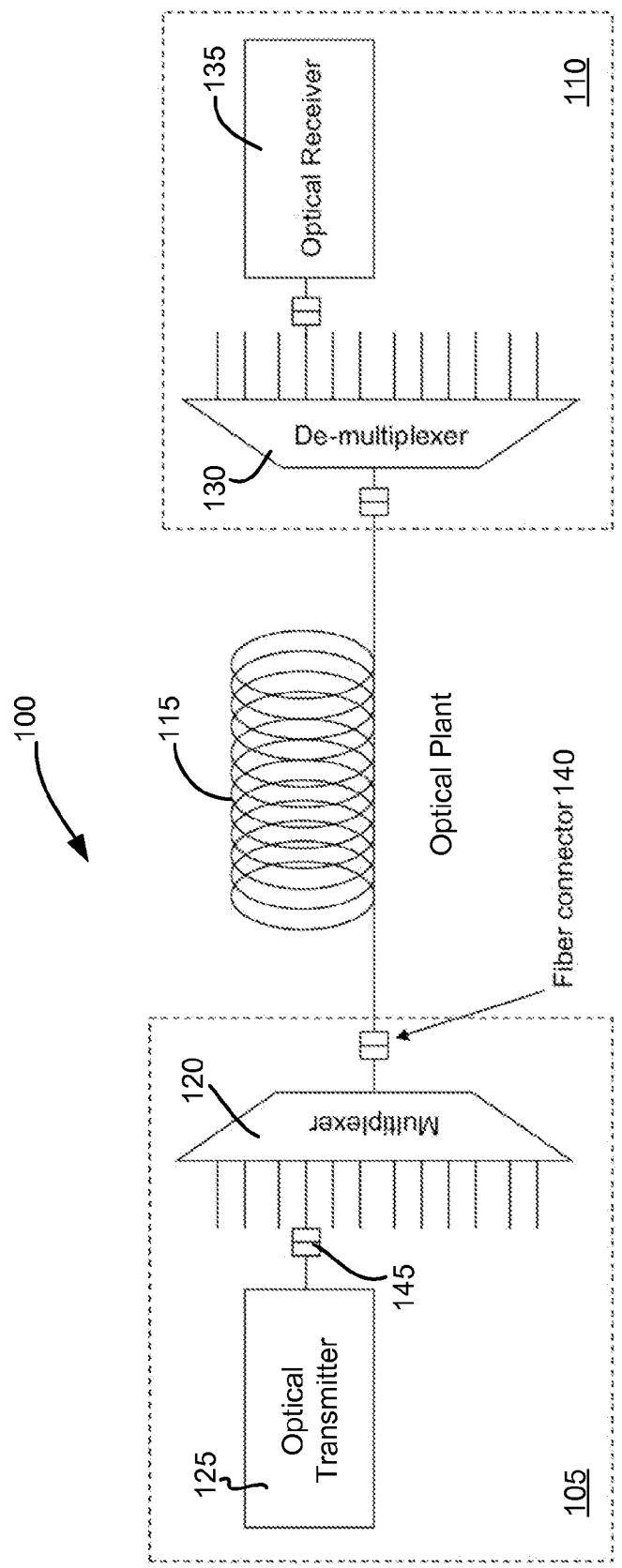
FIG. 1 illustrates an exemplary network in which embodiments described herein may be implemented.

FIG. 1 is a block diagram of an exemplary network 100 in which embodiments described herein may be implemented. As illustrated, network 100 may include a transmitting office 105 and a receiving office 110 connected by optical plant 115. In some implementations, transmitting office 105 and receiving office 110 may be commonly referred to as "central offices," and may each include transmitting and receiving components for interfacing with optical plant 115 and other connected devices or networks (not shown).

In one exemplary embodiment, optical plant 115 may include one or more optical fibers extending distances ranging from 20 to 200 kilometers (km). Each optical fiber in optical plant 115 may also include a large number of individual channels upon which data may be transmitted. For example, data in network 100 may be transmitted using wavelength division multiplexing (WDM), in which multiple optical carrier signals are transmitted on a single optical fiber by using different wavelengths of laser light or electromagnetic radiation to carry different channels.

In some implementations, data in network 100 may be transmitted using dense wavelength division multiplexing (DWDM). DWDM uses the C band (i.e., frequencies between 1530 and 1565 nanometers (nm)) and/or L band (i.e., wavelengths between 1565 and 1625 nm). The term "light" as used herein should be construed to include any type of electromagnetic radiation. Although not shown in FIG. 1, optical plant 115 may include additional components, such as optical amplifiers, additional reconfigurable optical add/drop multiplexers (ROADMs), etc.

Transmitting office 105 may include a multiplexer 120 and a number of a tunable optical transmitters 125 (one of which is shown in FIG. 1). In some instances, optical transmitter(s) 125 may include transponder cards (not shown) for use with multiplexer 120. Receiving office 110 may include a de-multiplexer 130 and a number of optical receivers 135 (one of which is shown in FIG. 1). Although only one transmitter 125 and one receiver 135 are shown in FIG. 1, in operation, transmitting office 105 and receiving office 110 may include a number of transmitters 125 and receivers 135 corresponding to a number of channels or ports in multiplexer 125 and de-multiplexer 130, respectively.

Multiplexer 120 may include any optical device configured to receive optical data signals on a number of ports, with each port being associated with a different channel or wavelength. Multiplexer 120 may multiplex or interleave the received signals together to create an aggregate or multiplexed data signal. The multiplexed data signal is then injected onto optical plant 115. As shown, multiplexer 120 may be coupled to optical plant 115 via a first fiber connector 140 and to tunable optical transmitter(s) 125 via second fiber connector(s) 145. Exemplary fiber connectors 140 and 145 may include optical connectors, such as angled physical contact (APC) connectors and ultra physical contact (UPC) connectors. In one implementation, optical transmitter(s) 125 may be spaced from multiplexer 120 by a distance of approximately 100 meters or less.

De-multiplexer 130 in receiving office 110 performs a function reverse to that of multiplexer 120. That is, de-multiplexer 130 may be configured to receive a multiplexed optical signal from optical plant 115 and de-multiplex, or extract, the individual data signals. The extracted optical signals are then output toward optical receiver(s) 135 via a number of ports. Optical receiver(s) 135 may convert a received data signal from an optical signal to an electrical signal and forward the electrical signal for additional downstream transmission or processing.

As described in more detail below with respect to FIGS. 4A and 4B, each tunable optical transmitter 125 may be configured to include a laser or other light source capable of being tuned to output a light signal at any of a number of wavelengths, such as wavelengths in the C or L bands. Although not shown in FIG. 1, optical transmitter(s) 125 may also include an interface for receiving electrical signals from an upstream network or device. Optical transmitter 125 may convert the received electrical signals to corresponding optical signals at a particular wavelength. In other implementations, optical transmitter 125 may receive previously generated optical signals. Selection of the wavelength may be made in accordance with embodiments described herein.

Consistent with embodiments described herein, the principle of linear back scattering may be used to enable automatic tuning of a laser in optical transmitter 125. More specifically, Rayleigh back scattering refers to attenuation in the power of an optical signal caused by scattering of a portion of an input signal back toward the source of the signal. The intensity of Rayleigh back scattering depends on the length of fiber and can be represented by the expression:

$$R_{Ray} = \int_0^{nl/c} S\alpha_s c \exp\left[-2\alpha \frac{ct}{2}\right] dt,$$

where S is the fraction of scattered light recaptured into an optical fiber, $\alpha_s$ is the Rayleigh scattering loss, $\alpha$ is the optical fiber loss, c is the speed of light, and 1 is the length of the optical fiber. Accordingly, the amount of Rayleigh back scattering is directly proportional to the length of the optical fiber.

More specifically, in a long haul optical fiber, the value of Rayleigh back scattering is detectible. For example, the Rayleigh back scattering of a 20 kilometer fiber is about −31 decibels (dB). Rayleigh back scattering of this level can be detected or monitored relative to a noise floor of the optical fiber. Exemplary noise floor values may range from −10 dB to −20 dB. Because of the relative lengths of their fiber components, large measurable amounts of Rayleigh back scattering may be observed for the optical fiber in optical plant 115 and may be significantly smaller or not observed in the fiber connections between transmitter 125 and multiplexer 130.

In addition to Rayleigh back scatting, another phenomenon observed in fiber optic connections includes Fresnel reflection. Fresnel reflection refers to light reflected back to its source when moving between media of differing refractive indices, such as fiber interfaces at fiber connectors 140 and 145. Although index matching is attempted in fiber optic connections, in many instances differences in refractive indices exist at the various optical interfaces. Although Fresnel reflection can be observed both in front of any behind multiplexer 130, its effects have been found to be negligible for the purposes of the concepts described herein.

Figure 2:
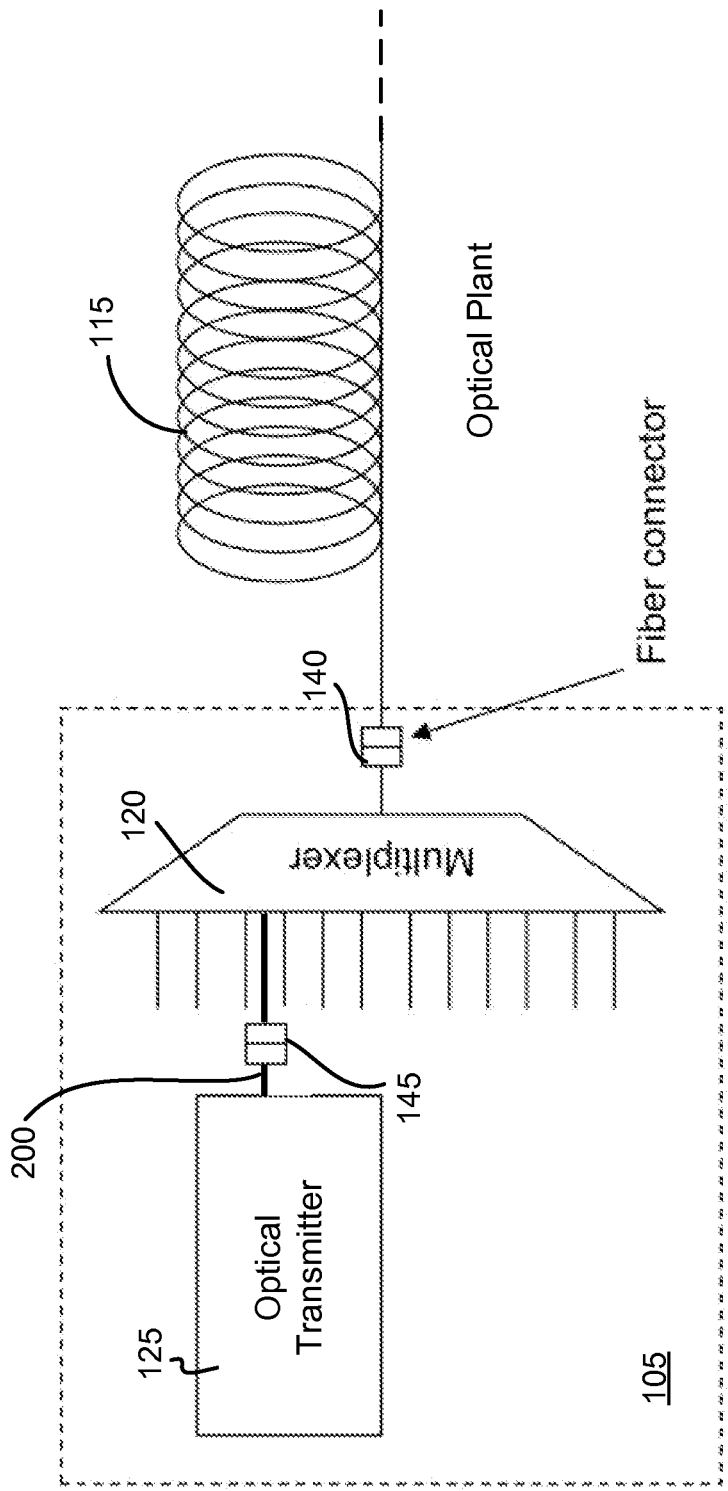
FIGS. 2 and 3 are block diagrams illustrating a transmitter-side of the network of FIG. 1.

Consistent with embodiments described herein, detected amounts of Rayleigh scattering may be used to identify a wavelength of a port or channel to which a particular optical transmitter 125 is connected. For example, FIG. 2 is a block diagram illustrating the transmitter side of network 100 in which optical transmitter 125 outputs an optical signal at a wavelength that is not matched to the wavelength associated with the port on multiplexer 130 that transmitter 125 is connected to.

As depicted by line 200, an optical signal output by transmitter 125 is lost within multiplexer 130 when the signal wavelength does not match the wavelength of the channel to which it is injected. As discussed above, in this instance, back scattering or reflections detected at transmitter 125 may be minimal, owing to the fact that both Fresnel reflection and Rayleigh back scattering are minimal for fiber lengths of approximately 100 meters or less.

Figure 3:
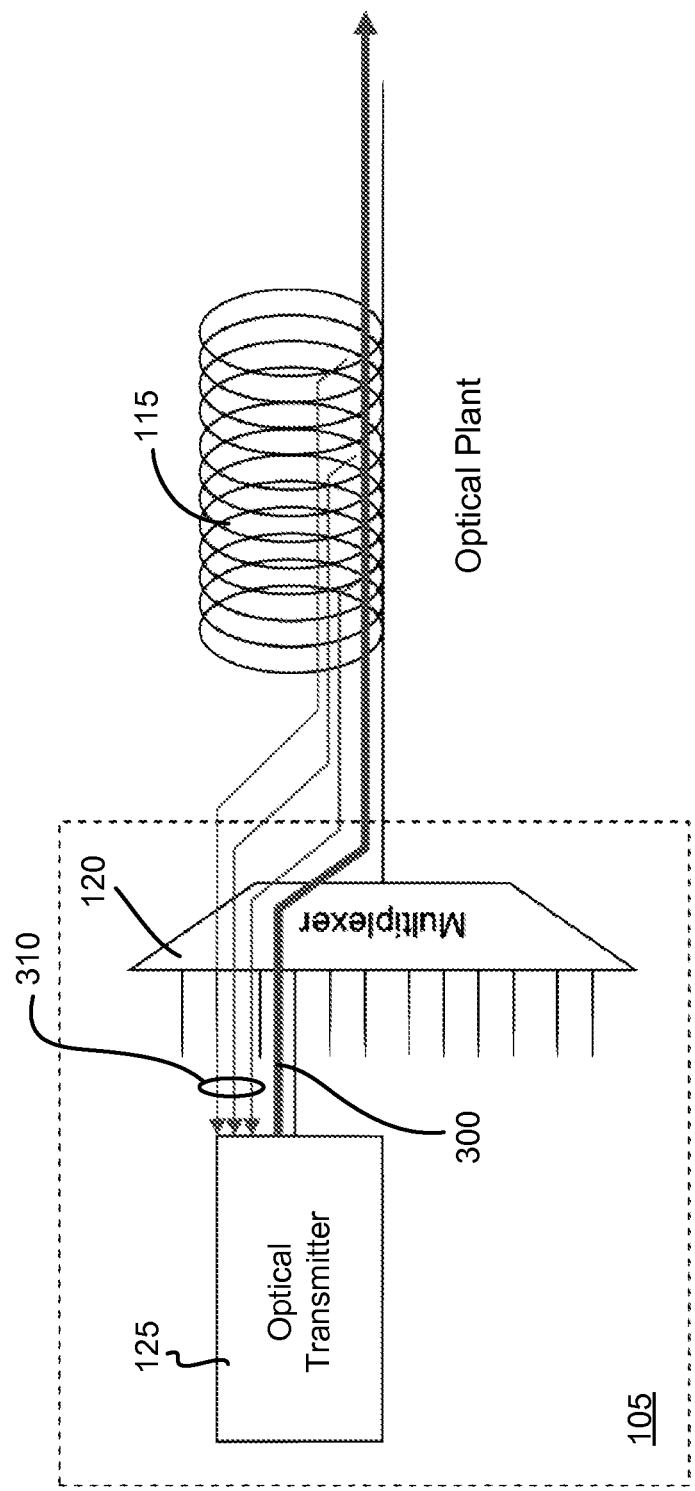

FIG. 3 is another block diagram illustrating the transmitter side of network 100 in which optical transmitter 125 outputs an optical signal at a wavelength that is matched to the wavelength associated with the port on multiplexer 130 to which transmitter 125 is connected. As depicted by line 300, when the wavelength of the optical signal output by transmitter 125 matches the wavelength of the channel to which it is injected, the signal passes through multiplexer 130 and into optical plant 115.

As discussed above, when the input signal 300 traverses long haul optical plant 115 (with a length of approximately 20 km or more), Rayleigh back scattering (depicted as return signals 310) may return through multiplexer 130 and may be observed at transmitter 125. Accordingly, observation of a relatively high level of back scattering may indicate that transmitter 125 is tuned to the proper wavelength.

Figure 4A:
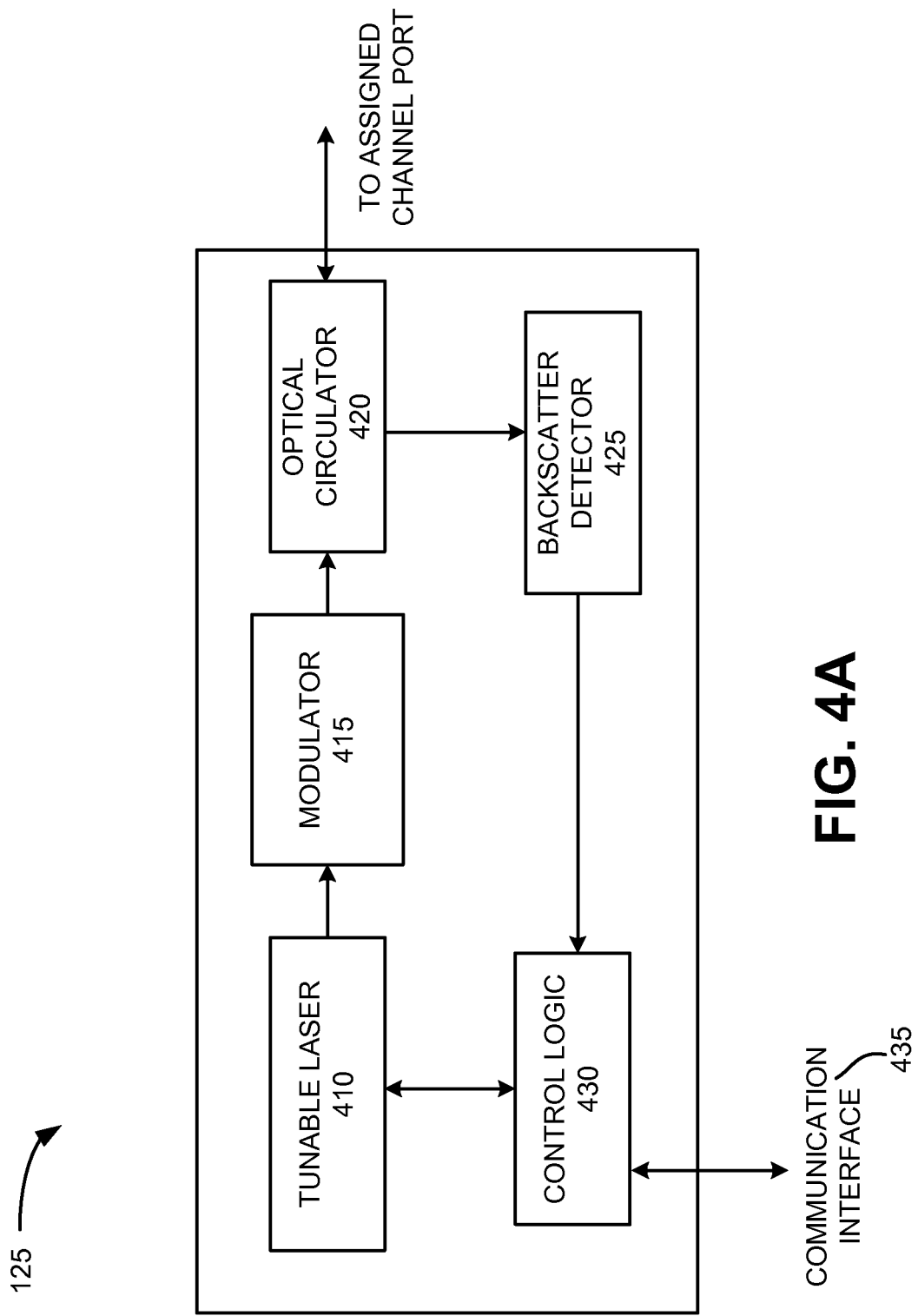
FIGS. 4A and 4B are block diagrams illustrating exemplary configurations of the optical transmitter of FIG. 1 configured in accordance with embodiments described herein.
Figure 4B:
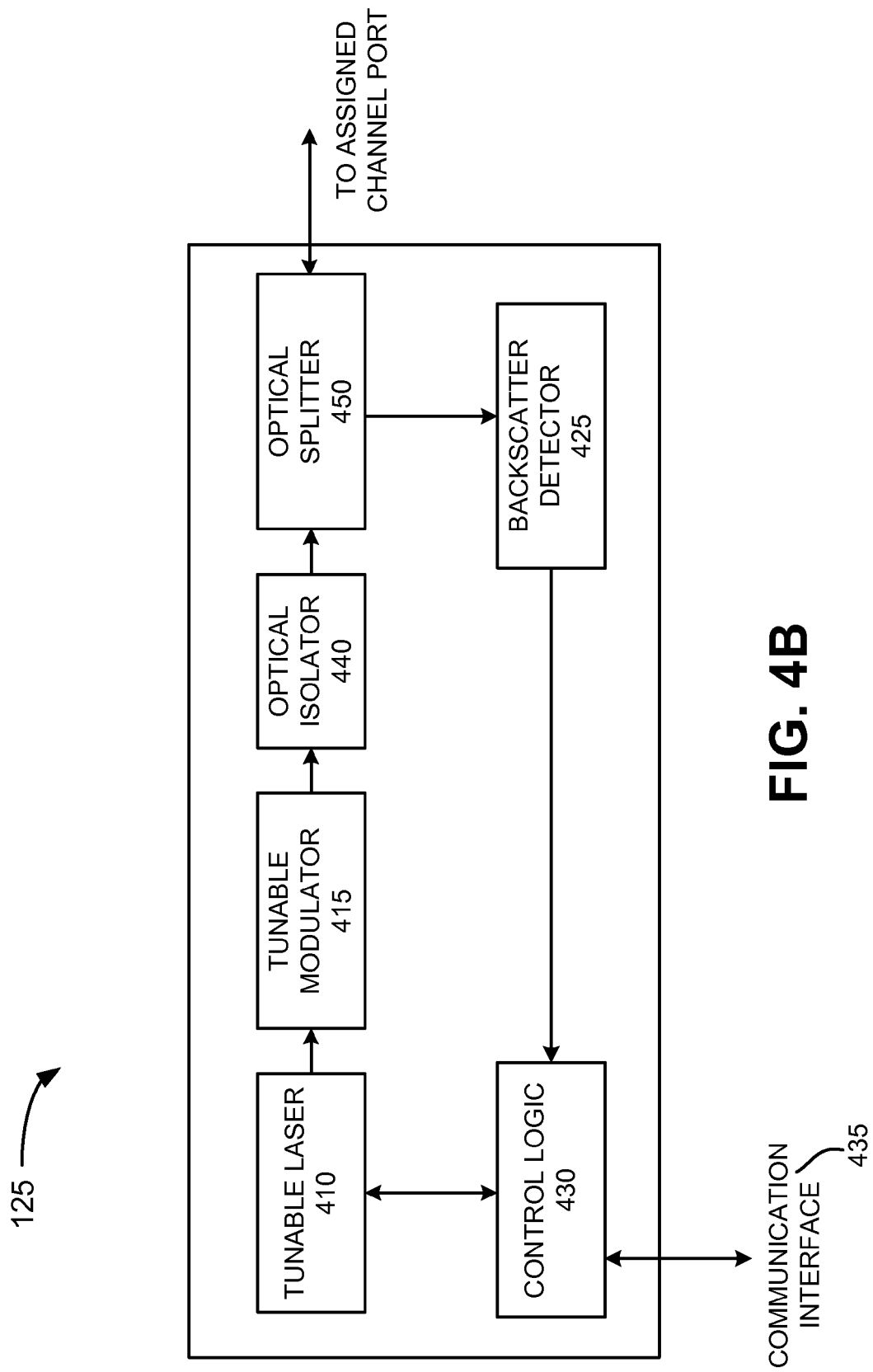

FIGS. 4A and 4B are block diagrams illustrating exemplary configurations of the optical transmitter 125 of FIG. 1 configured in accordance with embodiments described herein. As shown in FIG. 4A, optical transmitter 125 may include tunable laser 410, modulator 415, optical circulator 420, backscatter detector 425, control logic 430, and communication interface 435. The configuration illustrated in FIG. 4A is provided for simplicity. In other implementations, optical transmitter 125 may include more, fewer, or a different arrangement of components. For example, transmitter 125 may include one or more interface components to enable receipt of information from other devices, such as network devices, input devices, etc.

Tunable laser 410 may include an erbium doped fiber light source (i.e., a laser) that emits a broadband spectrum in the C-band (i.e., wavelengths between 1530 and 1565 nanometers) and/or L band (i.e., wavelengths between 1565 and 1625 nanometers). In other embodiments, tunable laser 410 may include a number of discrete wavelength light sources, where tuning is accomplished by selectively activating a particular one of the light sources. Tunable laser 410 may also provide an optical signal adequate for high data modulation, such as 100 Gbps or more.

Tunable laser 410 may be configured to output light at a particular or known wavelength. For example, in an exemplary implementation, tunable laser 410 may support 50 GHz and 100 GHz channel spacing. The tuning range of tunable laser 410 may cover C-band and L-band wavelengths. In addition, the tuning accuracy of tunable laser 410 may be based on the 50 GHz international telecommunications unit (ITU) grid. The wavelength values of tunable laser 410 listed above are exemplary only and tunable laser 410 may have other parameters based on the particular circumstances and/or optical path being tested.

Consistent with embodiments described herein, tunable laser 410 may receive commands from control logic 430 to output an optical signal that scans through a range of wavelengths, such as C or L-band wavelengths. Tunable laser 410 may then receive a command from control logic 430 to output a signal at a particular wavelength identified as the wavelength associated with the connected channel on multiplexer 130. For example, control logic 430 may be configured to receive a configuration setup request from a network administrator (e.g., via communication interface 435) and initiate wavelength scanning of the optical signal from tunable laser 410.

Modulator 415 receives the output signal from tunable laser 410 and modifies the signal by modulation (e.g., by either pulsing it off and on or by changing the phase of the signal) so that the signal carries information. DWDM systems typically use phase modulation with each variation representing a 1 or a 0 in a corresponding electrical signal. Although not shown in FIG. 4A, modulator 415 may receive an input electrical signal from an upstream data source. In this case, modulator 415 then modulates the output signal from tunable laser 410 based on the received input electrical signal. In an exemplary implementation, modulator 415 may modulate the optical signal from tunable laser 410 at a bit rate ranging from approximately 2.5 Gbps to approximate 100 Gbps.

Optical circulator 420 may be provided downstream of modulator 415 and operate to allow transmission of light in only one direction, e.g., the downstream direction. Optical circulator 420 prevents return light from traveling back to modulator 415 and tunable laser 410, thereby protecting these components from damage or interference caused by return optical signals. In addition, optical circulator 420 is configured to redirect returned optical signals to another output, e.g., toward backscatter detector 425.

FIG. 4B illustrates another exemplary implementation of optical transmitter 125. As shown, transmitter 125 in FIG. 4B includes an optical isolator 440 and optical splitter 450 in place of optical circulator 420. Similar to optical circulator 420, optical isolator 440 may be provided downstream of modulator 415 to prevent return light from traveling back to modulator 415 and tunable laser 410, thereby protecting these components from damage or interference caused by return optical signals. Unlike circulator 420, optical isolator 440 does not include redirection components. Optical circulator 420 and isolator 440/splitter 450 may be referred to as optical protection devices.

To enable detection of return signals from multiplexer 130, transmitter 125 of FIG. 4B includes optical splitter 450 configured to split an upstream optical signal from multiplexer 130 into two upstream signals, each having, for example, 50% of the optical power of the received return signal, one directed toward optical isolator 440, and the other directed toward backscatter detector 425.

Referring to both FIGS. 4A and 4B, back scatter detector 425 may include a component configured to receive the return path signal from circulator 420/coupler 450 and identify a level of back scatter included therein. As described above, higher levels of back scatter may indicate that tunable laser 410 is tuned to a proper wavelength, that results in the generated optical signal being propagated through multiplexer 130 to optical plant 115. When the optical signal generated by tunable laser 410 is set to an incorrect wavelength, optical signals are not propagated through multiplexer 130 and relatively lower amounts of back scatter may be detected.

Figure 5:
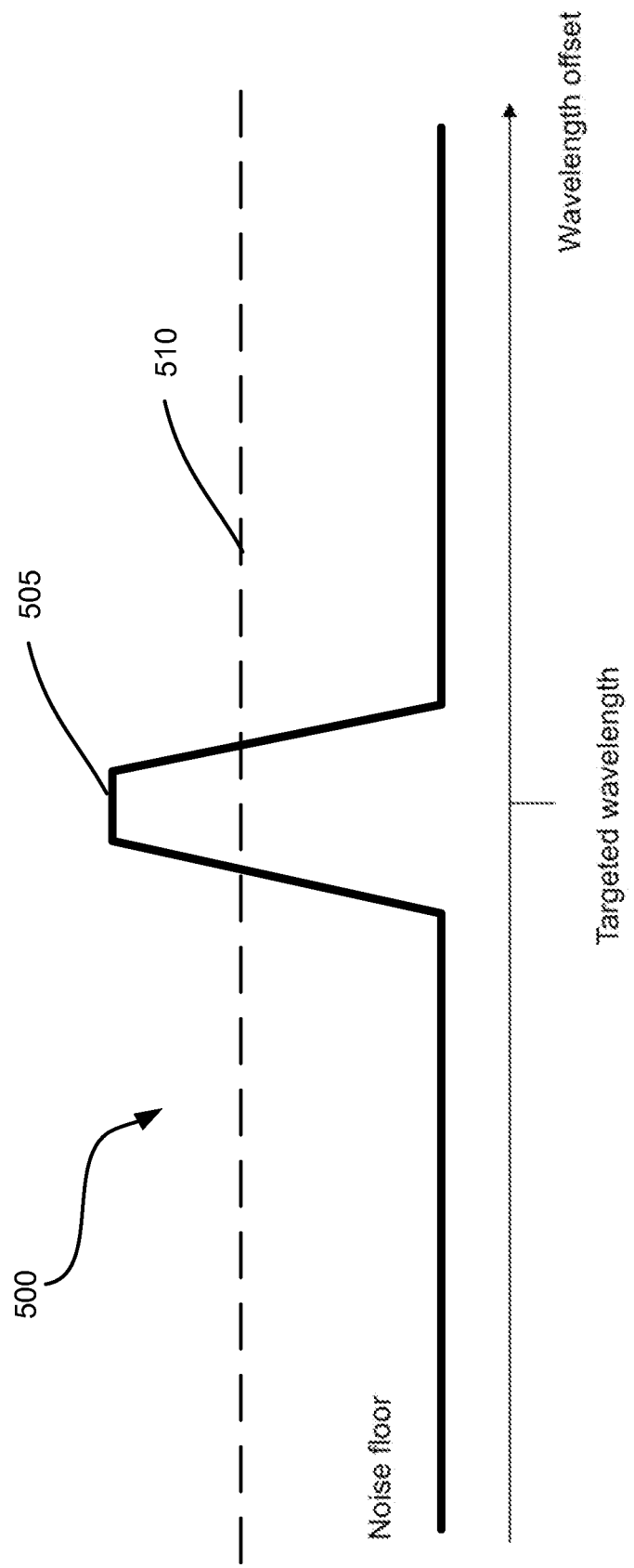
FIG. 5 is a plot of a back scatter optical power curve over a range of wavelengths, illustrating an exemplary output of the back scatter detector of FIGS. 4A and 4B.

Back scatter detector 425 may include a photodiode (e.g., a indium-gallium-arsenide (InGaAs) or germanium photoconductor) or other sensor configured to detect the optical power of a received signal output from circulator 420/splitter 450 relative to a reference power level, also referred to as a noise floor. The measured optical power represents the back scatter associated with the output optical signal when inserted into optical plant 115. Consistent with implementations described herein, back scatter detector 425 may transmit a value indicative of the measured back scatter power to control logic 430 for use in determining the proper wavelength for the optical signal. FIG. 5 is a plot 500 of a back scatter optical power curve 505 over a range of wavelengths, illustrating an exemplary output of back scatter detector 425. As shown, back scatter power level curve 505 peaks when tunable laser 410 is set to the proper wavelength.

Control logic 430 may include logic to control the wavelength of tunable laser 410 based on information received from back scatter detector 425 and/or instructions received via communication interface 435. For example, communication interface 435 may receive instructions from a control device external to transmitter 125 via a computer network. In other implementations, communications interface 435 may include input/output logic, such as a display, keyboard, peripheral port (e.g., universal serial bus (USB) port), etc. for receiving configuration instructions.

Figure 6:
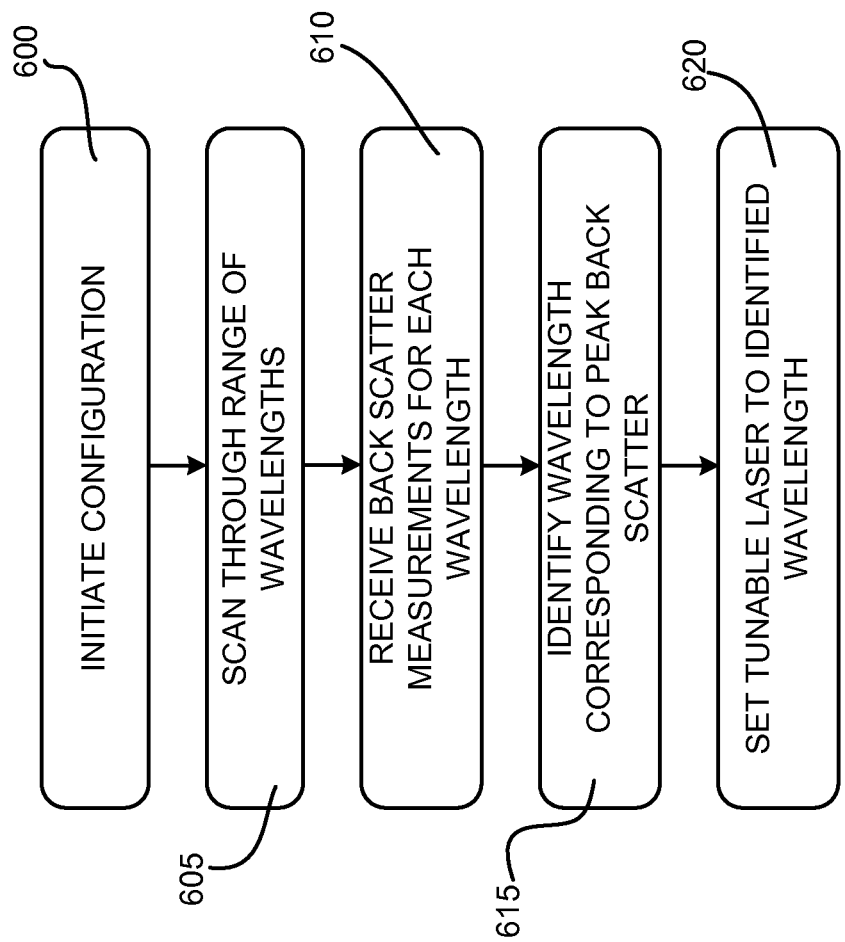
FIG. 6 is a flow diagram illustrating exemplary processing associated with configuring a wavelength of the transmitter of FIG. 1.

FIG. 6 is a flow diagram illustrating exemplary processing associated with configuring a wavelength of transmitter 125. Processing may begin when a network engineer or another party, for example, sends a configuration initialization command to control logic 430 (block 600). In response to this command, control logic 430 may initiate scanning of an output of tunable laser 410 through a configured range of wavelengths, such as C-band wavelengths, separated by an appropriate grid spacing (e.g., a 100 GHz spacing) (block 605). For example, wavelength scanning may be approximately 0.1 nm per step. In another embodiment, the scanning may be continuous through the range of wavelengths.

For each wavelength, control logic 430 may receive a measure of the back scatter optical power from back scatter detector 425 (block 610). Following signal output throughout the wavelength range, control logic 430 may identify the wavelength that corresponds to an observed peak back scatter optical power (block 615). Control logic 430 may set the wavelength of tunable laser 410 based on this wavelength (block 620).

Figure 7:
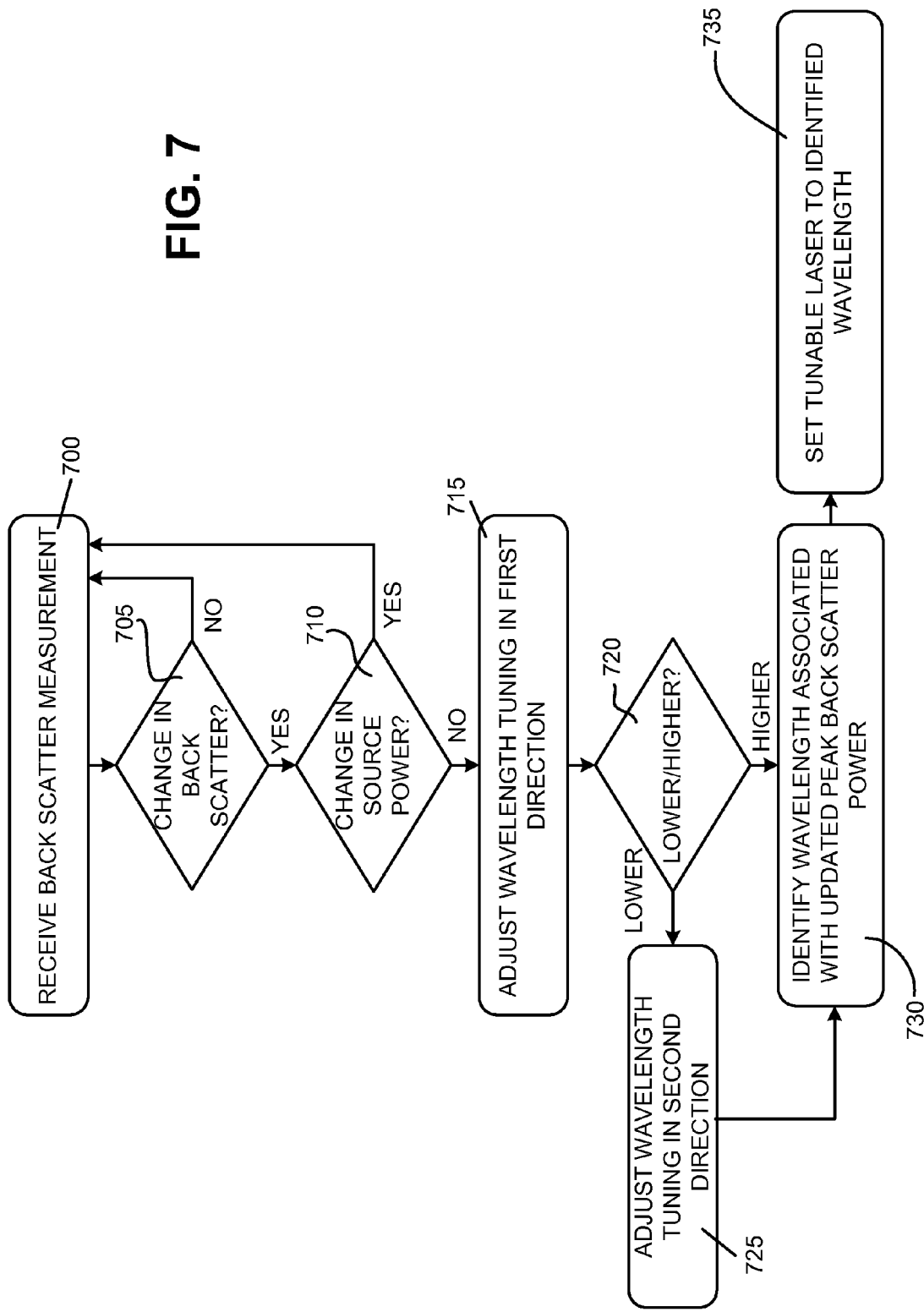
FIG. 7 is a flow diagram illustrating exemplary processing associated with configuring a wavelength of the transmitter of FIG. 1 in response to wavelength drift.

Transmitter 125 of FIGS. 4A and 4B may also be used to correct for wavelength drift that takes place during operation of transmitter 125. FIG. 7 is a flow diagram illustrating exemplary processing associated with configuring a wavelength of transmitter 125 in response to wavelength drift. Processing may begin when control logic 430 receives a measure of the back scatter optical power from back scatter detector 425 (block 700). Control logic 430 may determine whether a drop or decrease in back scatter optical power has been observed (block 705). For example, control logic 430 may compare a received back scatter optical power measurement for a current sampling interval against the received back scatter optical power measurement for the previous sampling interval. In other implementations, the current back scatter optical power measurement may be compared to a threshold power level (illustrated as dashed line 510 in FIG. 5). In either case, if it is determined that a decrease in back scatter optical power has not been detected (block 705—NO), control logic 430 may return to block 700 for a next sampling interval.

If a decrease in back scatter optical power has been detected (block 705—YES), control logic 430 may determine whether an optical power of the source signal (e.g., as output by tunable laser 410) has changed in a manner that accounts for the detected change in the back scatter optical power (block 710). If it is determined that a change in the optical power of the source signal accounts for the change in back scatter optical power (block 710—YES), control logic 430 may return to block 700 for a next sampling interval.

However, if it is determined that no change in the optical power of the source signal has occurred (block 710—NO), control logic 430 may adjust (e.g., incrementally) the tuning of the wavelength of tunable laser 410 in a first direction (e.g., upward) (block 715). Control logic 430 may then determine whether the detected back scatter optical power has further decreased or whether it has increased (block 720). If the back scatter optical power has further decreased (block 720—LOWER), control logic 430 may adjust the tuning of the wavelength of tunable laser 410 in a second direction opposite to the first direction (block 725). For example, if an adjustment from a 1605 nm wavelength signal to a 1610 nm wavelength signal results in a further decrease in back scatter optical power, control logic may adjust the tuning of laser 410 to a 1600 nm wavelength signal. Control logic 430 may continue adjusting the wavelength of tunable laser 410 to find an updated peak back scatter optical power (block 730).

Returning to block 720, if control logic 430 may determine that the detected back scatter optical power has increased (block 720)—HIGHER), processing may proceed to block 730 for continued adjustment of the wavelength of tunable laser 410 to find the updated peak back scatter optical power (block 730). Control logic 430 may then set the wavelength of tunable laser 410 based on the wavelength corresponding to the updated peak back scatter optical power (block 735). Processing may then proceed to block 700 for a next sampling interval. In some implementations, measurement of back scatter optical power and adjustments to tunable laser 410 may be made continuously.

Figure 8:
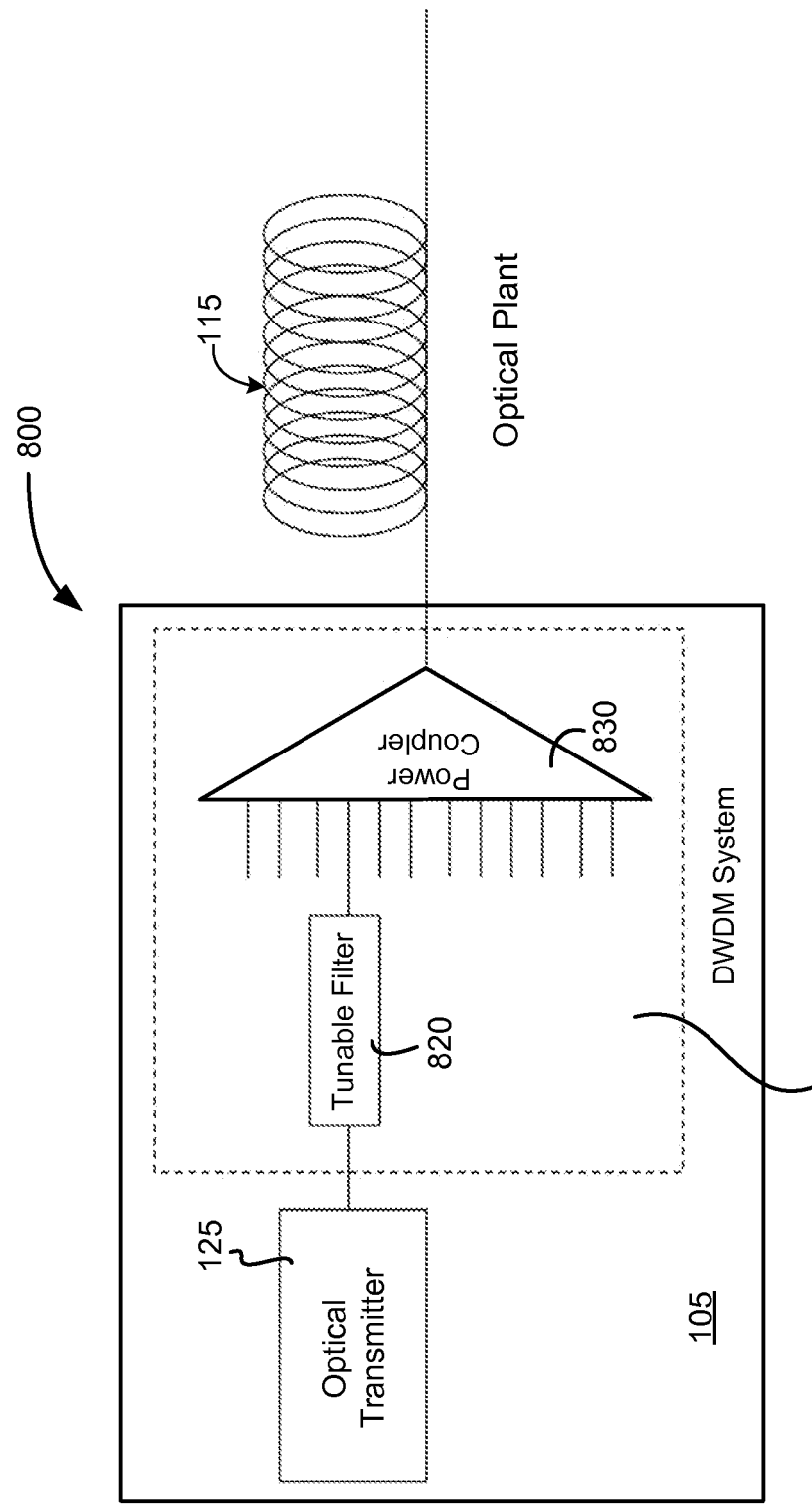
FIG. 8 illustrates another exemplary network in which systems and methods described herein may be implemented.

FIG. 8 is a block diagram illustrating another exemplary configuration of an optical transmitter 125 of FIG. 4A or 4B implemented in a dynamically configurable wavelength environment 800. In this embodiment, transmitter 125 may be coupled to a dynamic element, such as a reconfigurable optical add-drop multiplexer (ROADM) 810. In such an implementation, ROADM 810 may include a tunable filter 820 and a power coupler 830. The configuration illustrated in FIG. 8 is provided for simplicity. In other implementations, more, fewer, or a different arrangement of components may be included in dynamically configurable wavelength environment 800.

Tunable filter 820 may include a controllable band-pass filter (e.g., a WDM filter) configured to pass an optical signal of a configured wavelength to power coupler 830 for injection into optical plant 115. By using a ROADM, individual or multiple optical channels having different wavelengths may be added and/or dropped from a transport optical fiber without requiring conversion of the optical signals on the WDM channels to non-optical (i.e., electrical) signals and then back to optical signals.

Because tunable filter 820 can be changed to a different wavelength at any time, the wavelength of tunable laser 410 me be updated or re-tuned in the event of a change in filter 820. FIG. 9 is a flow diagram illustrating exemplary processing associated with configuring a wavelength of transmitter 125 in response to changes in dynamic wavelength environment 800. Processing may begin when control logic 430 receives a measure of the back scatter optical power from back scatter detector 425 (block 900). Control logic 430 may observe a substantial reduction in the detected back scatter optical power (block 905). In some instances a substantial reduction may refer to an unmeasurably low back scatter relative to a noise floor of transmitter 125. In others, a substantial reduction in the detected back scatter optical power may include a reduction of at least 25 decibels (dB). For example, control logic 430 may compare a received back scatter optical power measurement for a current sampling interval against the threshold value.

Control logic 430 determine whether an optical power of the source signal (e.g., as output by tunable laser 410) has changed in a manner that accounts for the decrease in observed back scatter optical power (block 910). If it is determined that a change in the optical power of the source signal accounts for the change in back scatter optical power (block 910—YES), control logic 430 may return to block 900 for a next sampling interval.

However, if it is determined that no change in the optical power of the source signal has occurred (block 910—NO), control logic 430 may initiate a wavelength scan by tunable laser 410 (block 915), similar to the processing described above with respect to FIG. 6.

For each wavelength in the scan, control logic 430 may receive a measure of the back scatter optical power from back scatter detector 425 (block 920). Following signal output throughout the wavelength range, control logic 430 identifies the wavelength that corresponds to an updated observed back scatter optical power peak (block 925). Control logic 430 may set the wavelength of tunable laser 410 based on this wavelength (block 930).

In the manner described above, a wavelength of an optical transmitter or transponder 125 may be automatically configured upon installation to a multiplexer 130 or ROADM device 810. More specifically, detecting a peak power in a back scatter signal (e.g., caused by Rayleigh back scattering) received upstream from the multiplexer or ROADM may be used to identify the proper wavelength for the optical transmitter. Systems and methods consistent with these embodiments enable efficient configuration of optical transmitters, by not requiring control connections between the multiplexer 130/ROADM 810 and transmitter 125. In addition, wavelength changes experienced after installation may also be automatically reflected in the tuning of transmitter 125.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above in an environment 800 having a relatively small number of transmitters 125. In other implementations, environments having more transmitters 125 or multiplexers 130 may be used. In addition, while series of acts have been described with respect to FIGS. 6, 7, and 9, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An optical transmitter, comprising:
   a tunable signal source configured to emit a signal to an optical fiber system at a plurality of wavelengths,
   wherein the optical fiber system includes a multiplexer device having a plurality of ports corresponding to a plurality of wavelengths or a tunable filter configured to pass one of the plurality of wavelengths;
   a back scatter detector for measuring an amount of back scatter observed following injection of the signal to the optical fiber system; and
   control logic configured to:
      cause the tunable signal source to scan through a range of wavelengths;
      receive, from the back scatter detector, measured amounts of back scatter for each of the wavelengths in the range of wavelengths;
      identify a wavelength corresponding to a peak back scatter amount;
      determine a particular port on the multiplexer device or a setting for the tunable filter to which the optical transmitter is connected based on the identified wavelength; and
      automatically set the tunable signal source based on the identified wavelength.

2. The optical transmitter of claim 1, wherein the tunable signal source comprises a tunable laser.

3. The optical transmitter of claim 1, further comprising:
   an optical circulator to prevent transmission of the back scatter to the tunable signal source.

4. The optical transmitter of claim 3, wherein the optical circulator is configured to transmit the back scatter to the back scatter detector.

5. The optical transmitter of claim 1, wherein the optical fiber system comprises:
   an optical plant connected downstream of the multiplexer or tunable filter for receiving the optical signal when the tunable signal source is set to the identified wavelength.

6. The optical transmitter of claim 1, wherein the back scatter detector comprises a photodiode for measuring an optical power of the received back scatter from the optical fiber system.

7. The optical transmitter of claim 1, wherein the control logic is further configured to:
   periodically monitor the amount of back scatter for the identified wavelength;
   determine that a decrease in the amount of back scatter has occurred indicative of wavelength drift in the tunable signal source;
   automatically adjust the wavelength of the tunable signal source until an updated peak back scatter amount is detected; and
   set the wavelength of the tunable signal source based on the adjusted wavelength.

8. The optical transmitter of claim 7, wherein the control logic to automatically adjust the wavelength of the tunable signal source until the updated peak back scatter amount is detected, is further configured to:
   incrementally adjust the wavelength of the tunable signal source in a first direction;
   determine whether the back scatter amount associated with the adjusted wavelength is increased or further decreased; and
   incrementally adjust the wavelength of the tunable signal source in a second direction different from the first direction when the back scatter amount associated with the adjusted wavelength is further decreased.

9. The optical transmitter of claim 1, wherein the control logic is further configured to:
   determine whether a power of the signal has changed in a manner that has caused the reduction in the amount of back scatter; and
   automatically adjust the wavelength of the tunable signal source when the power of the signal has not changed in a manner that has caused the reduction in the amount of back scatter.

10. A method for configuring a tunable laser in an optical transmitter, comprising:
    outputting an optical signal from the tunable laser into an optical fiber system that includes a multiplexer and a long haul optical fiber;
    scanning the output optical signal through a range of wavelengths;
    monitoring an amount back scatter received from the multiplexer for each of the wavelengths;
    identifying a wavelength associated with a peak amount of back scatter;
    determining a port on the multiplexer to which the optical transmitter is connected based on the identified wavelength; and
    automatically setting the tunable laser based on the identified wavelength and the determined port.

11. The method of claim 10,
    wherein the multiplexer includes multiple ports, with each port being associated with a particular wavelength, and
    wherein it is determined that the optical signal is output to the port associated with the identified wavelength.

12. The method of claim 10, wherein the multiplexer comprises a reconfigurable add-drop multiplexer for dynamically changing a wavelength associated therewith.

13. The method of claim 10, further comprising:
    determining that a reduction in the amount of back scatter has occurred indicative of wavelength drift in the tunable laser;
    automatically adjusting the wavelength of the tunable laser until an updated peak back scatter amount is detected; and
    setting the wavelength of the tunable laser to the adjusted wavelength.

14. The method of claim 10, further comprising:
    determining that a substantial reduction in the amount of back scatter has occurred indicative of a possible change in the port on the optical multiplexer to which the optical transmitter is connected;
    scanning the output optical signal through a range of wavelengths;
    monitoring an amount of back scatter received from the multiplexer for each of the wavelengths;

identifying an updated wavelength associated with an updated peak amount of back scatter;

determining a new port on the optical multiplexer to which the optical transmitter is connected based on the updated wavelength; and setting the tunable laser based on the updated wavelength and the new port.

15. The method of claim 14, comprising:

determining whether a power of the output optical signal has changed in a manner that has caused the reduction in the amount of back scatter; and performing the scanning, monitoring, identifying, and setting when the power of the output optical signal has not changed in a manner that has caused the reduction in the amount of back scatter.

16. A tunable transponder card for connecting to an optical multiplexer, comprising:

a tunable laser for outputting a tuned optical signal;

a modulator for receiving the tuned optical signal and modulating the tuned optical signal to include data;

a protection device configured to enable passage of the tuned optical signal to the optical multiplexer and to reduce passage of reflected signals from the multiplexer to the modulator;

a back scatter detector coupled to the protection device for receiving reflected signals from the multiplexer; and control logic configured to:

cause tunable laser to output tuned optical signals in a range of wavelengths;

receive reflected signal information from the back scatter detector for each of the range of wavelengths, the reflected signal information representative of an optical power of the reflected signals received by the back scatter detector;

identify a wavelength associated with a peak reflected signal optical power;

determine a port on the optical multiplexer to which the tunable laser is coupled based on the identified wavelength; and automatically set the tunable laser based on the identified wavelength and the determined port.

17. The tunable transponder card of claim 16, wherein the tunable transponder card is positioned less than 100 meters from the multiplexer and wherein an optical plant having a length of at least 20 kilometers is coupled downstream of the multiplexer.

18. The tunable transponder card of claim 16, wherein the control logic is further configured to:

monitor the reflected signal optical power; and adjust the wavelength of the tunable laser when a reduction in the reflected signal optical power is identified.

19. The tunable transponder card of claim 18, wherein the control logic to adjust the wavelength of the tunable laser is further configured to:

determine whether the reduction in the reflected signal optical power is substantial; and when the reduction in the reflected signal optical power is substantial, the control logic is configured to:

cause tunable laser to output tuned optical signals in a range of wavelengths;

receive reflected signal information from the back scatter detector for each of the range of wavelengths, the reflected signal information representative of an optical power of the reflected signals received by the back scatter detector;

identify an updated wavelength corresponding to the peak reflected signal optical power; and set the tunable laser to the updated wavelength.

20. The transponder card of claim 18, wherein the control logic is further configured to:

determine whether a power of the output optical signal has changed in a manner that has caused the reduction in the amount of back scatter; and adjust the wavelength of the tunable laser when the power of the output optical signal has not changed in a manner that has caused the reduction in the amount of back scatter.

* * * * *